US012325293B2

(12) United States Patent
Stricker

(10) Patent No.: US 12,325,293 B2
(45) Date of Patent: Jun. 10, 2025

(54) TIRE SUN SHIELD

(71) Applicant: Herbert Stricker, South Lyon, MI (US)

(72) Inventor: Herbert Stricker, South Lyon, MI (US)

(*) Notice: Subject to any disclaimer, the term of this patent is extended or adjusted under 35 U.S.C. 154(b) by 0 days.

(21) Appl. No.: 18/599,206

(22) Filed: Mar. 8, 2024

(65) Prior Publication Data

US 2024/0208314 A1    Jun. 27, 2024

Related U.S. Application Data

(63) Continuation-in-part of application No. 18/196,881, filed on May 12, 2023.

(51) Int. Cl.
*B60J 11/10* (2006.01)

(52) U.S. Cl.
CPC ..................... *B60J 11/10* (2013.01)

(58) Field of Classification Search
CPC ........................................... B06J 11/10
USPC ................... 206/304, 304.1, 304.2
See application file for complete search history.

(56) References Cited

U.S. PATENT DOCUMENTS

| | | | | |
|---|---|---|---|---|
| 2,111,596 A | * | 3/1938 | Lewis ................... | B62D 43/005 206/304.2 |
| 4,121,638 A | * | 10/1978 | Phillips ................ | B62D 43/005 206/304.2 |
| 4,815,784 A | | 3/1989 | Zheng | |
| 5,035,460 A | | 7/1991 | Huang | |
| 5,076,477 A | * | 12/1991 | Colgan ................ | B62D 43/005 206/304.1 |
| 5,116,273 A | | 5/1992 | Chan | |

(Continued)

FOREIGN PATENT DOCUMENTS

| | | |
|---|---|---|
| CN | 202242927 U | 5/2012 |
| CN | 108248356 A | 7/2018 |
| DE | 3014238 A1 | 10/1981 |

OTHER PUBLICATIONS

EZ Fold RV Tire Shades, retrieved from https://magneshade.com/product/tire-shades/ on Mar. 15, 2023, Date First Available Aug. 5, 2020 on https://web.archive.org/web/20200805162832/https://magneshade.com/product/tire-shades/, pp. 1-3.

(Continued)

*Primary Examiner* — Jacob K Ackun
(74) *Attorney, Agent, or Firm* — Paratus Law Group, PLLC

(57) ABSTRACT

There is provided a tire sun shield, an attachment system for the tire sun shield, and a method of making and using the tire sun shield. A structure according to the present disclosure includes: a flexible fabric sheet including two holes; a flexible frame attached to a periphery of the flexible fabric sheet; two resilient fasteners, each of the two resilient fasteners having a first end and a second end and being threaded through a respective one of the two holes, two fasteners configured to attach to a wheel, one of the two fasteners being attached to the first end of one the resilient fasteners and another of the two fasteners being attached to the first end of another of the resilient fasteners; and two resilient fastener locks configured to be secured to a respective one of the two resilient fasteners at the front side of the flexible fabric sheet.

13 Claims, 14 Drawing Sheets

(56) References Cited

U.S. PATENT DOCUMENTS

| | | |
|---|---|---|
| 5,213,147 A | 5/1993 | Zheng |
| 5,358,440 A | 10/1994 | Zheng |
| 5,553,908 A | 9/1996 | Shink |
| 5,687,786 A | 11/1997 | Tsai |
| 5,732,759 A | 3/1998 | Wang |
| 5,785,106 A | 7/1998 | Hwang |
| 5,927,793 A | 7/1999 | McGrath, Jr. |
| 6,068,345 A | 5/2000 | Bressie |
| 6,142,192 A * | 11/2000 | Dickinson ............ B60C 25/147 141/97 |
| 10,131,217 B2 | 11/2018 | Super et al. |
| 10,780,734 B2 | 9/2020 | Hunckler et al. |
| 2003/0201665 A1 | 10/2003 | Kenion |
| 2004/0250483 A1 | 12/2004 | Zheng |
| 2005/0194774 A1 | 9/2005 | Romano |
| 2007/0278846 A1 | 12/2007 | Fleming |
| 2020/0001771 A1 | 1/2020 | Carney |
| 2024/0375500 A1 * | 11/2024 | Stricker ................ B60J 11/10 |

OTHER PUBLICATIONS

How to fold the new Sidewall Tire Shades, retrieved from https://www.youtube.com/watch?v=XKUUS6OSHWc, Mar. 10, 2014, pp. 1-2.

Yidee, Ydotuse Windshield Sun Shade Car Window Shade UV Reflector Keeps Vehicle Cool Folding Sun Visor Heat and Sun Reflector (Standard 59 x 31.5 inches), retrieved from https://www.amazon.com/YiDee-Windshield-Reflector-VehicleStandard/dp/B073YS1MHG/ on Mar. 15, 2023, Date First Available Jul. 16, 2017, pp. 1-7.

Feb. 27, 2025, United States Office Action issued for related U.S. Appl. No. 18/196,881.

* cited by examiner

TIRE SUN SHIELD

CROSS-REFERENCE TO RELATED APPLICATION

This application is a continuation-in-part of U.S. patent application Ser. No. 18/196,881, filed on May 12, 2023.

TECHNICAL FIELD

One or more embodiments described herein relate to a tire sun shield, an attachment system for the tire sun shield, and a method of making and using the tire sun shield.

BACKGROUND OF THE INVENTION

Tire dry rot or sidewall weather is the visible cracking in a tire when rubber compounds in a tire break down. Dry rot in rubber tires is caused by several factors including too much exposure to ultraviolet (UV) rays from sunlight, harsh weather conditions such as rain and snow, underinflation, or allowing the tires to be unused for extended periods of time.

Some vehicles, such as recreational vehicles (RV) are typically driven for brief periods of time during vacations and then parked and stored for long periods of time. Due to the large size of RVs, RVs are typically stored outside due to cost and space limitations and are thus uncovered leaving the tires vulnerable to environmental factors that could lead to dry rot. Typically, the exterior facing sidewalls of the tires have more exposure to the environmental factors and are thus more susceptible to degradation and dry rot. To protect the tires when parked outside, the tires should be covered to prevent harsh weather and ultraviolet rays from degrading tire rubber thereby causing dry rot and decreasing the longevity of the tires.

Several tire covers have been developed to protect a tire from environmental conditions as described above. For example, U.S. Patent Publication No. US2007/0278846A1 to Fleming describes a tire cover that includes an exterior front panel, side panels, and a rear panel that is installed by slipping the tire cover on the tire and the tire cover is secured by placing a flap connected to a bottom portion of the front panel under the tire.

U.S. Pat. No. 10,780,734 to Hunckler describes a tire cover that is held to the sidewall of a tire by bungee cords which are attached to a spring wire frame of the tire shade fabric. This tire cover is installed by stretching the bungee cords over the top of and behind the tire. Attachment of the bungee cords to the tire shade requires numerous parts including a locking collar, a clip, a D-Ring, and fabric strap.

Hunckler also describes, as a currently available design, fender mounted tire shades that include a square or rectangular shaped fabric and are attached to the fender of an RV by using snap connectors. However, the fender mounted tire shades are attached to the exterior of the fender of the RV utilizing snap connectors along the entire top and sides on the periphery of the fabric.

Although these previous types of tire covers offer protection from UV and environmental elements to prevent dry rot, they have several disadvantages in performance and useability. For example, installation of the cover is made by attaching the tire cover to the tire itself which requires the user to reach into the wheel well to secure the tire cover around the back of the tire. This installation method requires a user to touch the tire and wheel well by bending down and reaching into the wheel well which causes an awkward posture of the user and may cause dirt from the tire and wheel well to get on the user. Other installation difficulties include additional installation steps required to ensure the tire cover is properly secured such as placing the flap of Fleming, which is connected to a bottom portion of the front panel, under the tire to ensure the tire cover does not move, or adjusting the bungees of Hunckler at the front and rear of the tire to a 45-degree angle to ensure the bungees are tensioned correctly to hold the tire shade securely. Furthermore, installing the tire cover to the tire itself causes heat and moisture to be trapped between the tire and tire cover, thus leading to the tire to crack and deteriorate.

Furthermore, although the fender mounted tire cover described in Fleming is not attached to the tire itself, fender mounted tire covers require drilling multiple holes into the exterior of the fender to install one portion of each of the snap fasteners to the RV itself, which requires additional labor and time for initial setup. Furthermore, the numerous snap fasteners attached to the exterior of the fender are visible when the cover is not attached, thus decreasing the exterior aesthetics of the RV. Another problem with fender mounted tire covers is that they are difficult and time consuming to install and uninstall due to the process of attaching and detaching numerous snap fasteners along the periphery of the fabric.

In view of the disadvantages of the currently available tire covers, what is needed is a tire cover that is light weight, sturdy, does not take up as much space to store, is easy to install and uninstall, requires less labor and time for initial setup than currently available designs, does not trap heat/moisture when installed, and maintains the aesthetics of the RV when not in use.

SUMMARY OF THE INVENTION

As described above, several tire covers have been developed to protect a tire from environmental conditions. However, disadvantages in performance and useability cause an awkward posture of the user and dirt from the tire and wheel well to get on the user, include additional installation steps required to ensure the tire cover is properly secured, require additional labor and time for initial setup, or decrease in the exterior aesthetics of the vehicle.

In light of the foregoing, it is desirable to provide a tire sun shield, an attachment system for the tire sun shield, and a method of making and using the tire sun shield that is light weight, sturdy, does not take up as much space to store, is easy to install and uninstall, requires less labor and time for initial setup than existing designs, does not trap heat/moisture when installed, and maintains the aesthetics of the RV when not in use.

In accordance with one embodiment, a tire cover comprises a flexible fabric sheet having a front side, a rear side, a top, and a bottom, a flexible frame attached to a periphery of the flexible fabric sheet and having a folded state and an open state in which the flexible fabric sheet is tensioned, a top fastener connected to a periphery of the tire cover adjacent to the top of the flexible fabric sheet and configured to attach to a wheel well of a vehicle, the flexible fabric sheet including one hole located adjacent to the periphery of the flexible fabric sheet on one side of the top fastener and including another hole located adjacent to the periphery of the flexible fabric sheet on another side of the top fastener, a resilient fastener having two ends, one of the two ends being threaded through the one hole from the rear side to the front side of the flexible fabric sheet and another of the two ends being threaded through the another hole from the rear side to the front side of the flexible fabric sheet, and two side fasteners, one of the two side fasteners being attached to the one end of the resilient fastener and another of the two side fasteners attached to the another end of the resilient fastener, the two side fasteners being configured to attach to the wheel well of the vehicle.

DETAILED DESCRIPTION

Figure 1:
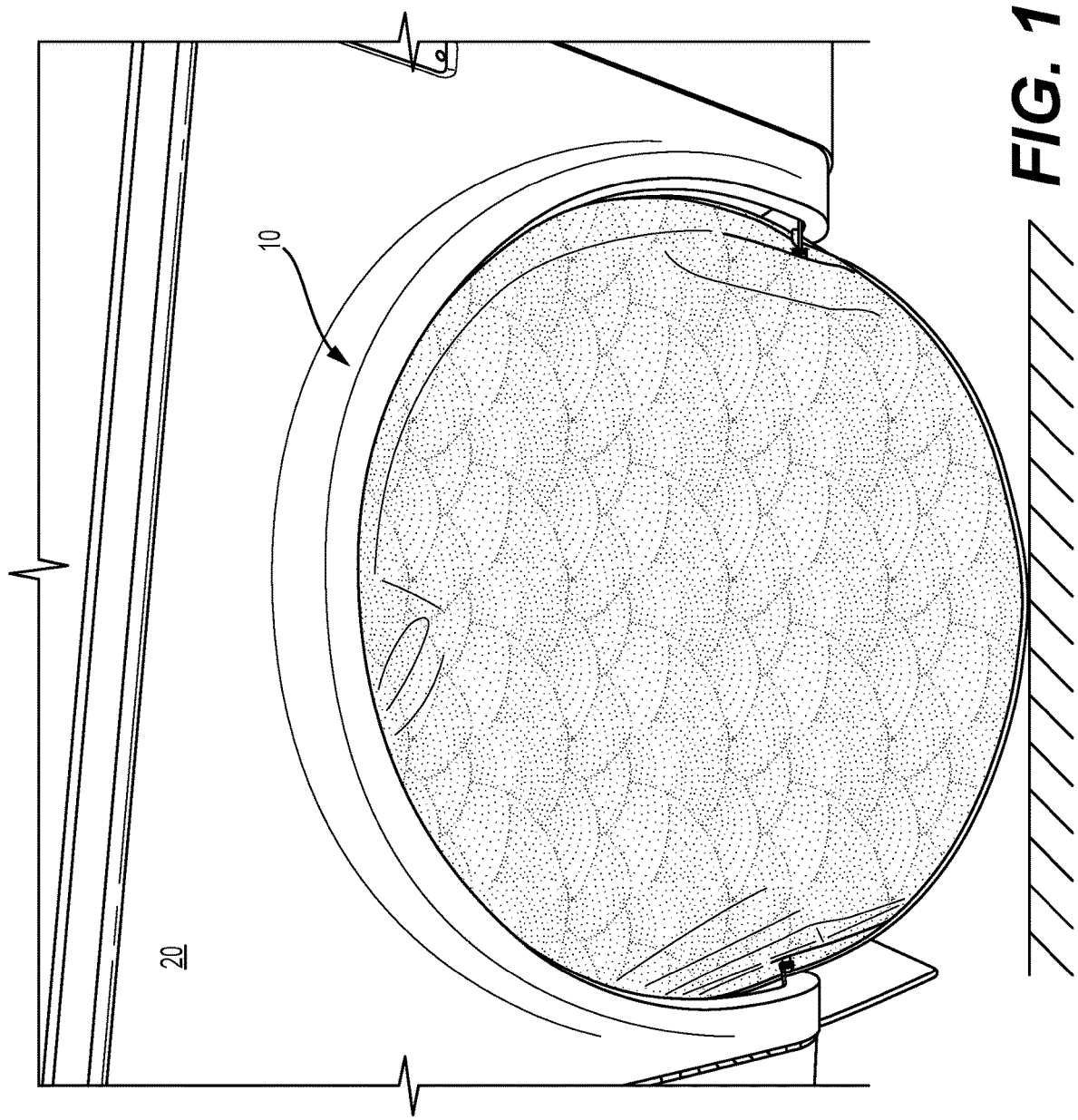
FIG. 1 depicts an embodiment of a tire cover installed on a tire.

FIG. 1 depicts an embodiment of a collapsible tire cover 10 configured to be installed on a vehicle 20 such as an RV to cover and protect the tire 30 (not shown) from dry rot due to rain, snow, UV rays, dust, dirt and other environmental factors. It should be noted, that although use of the tire cover 10 on an RV is shown and described, the present invention may be used to cover tires of other types of vehicles. For example, the tire cover 10 may cover the tires of a car, truck, van, bus, or the like.

Figure 2:
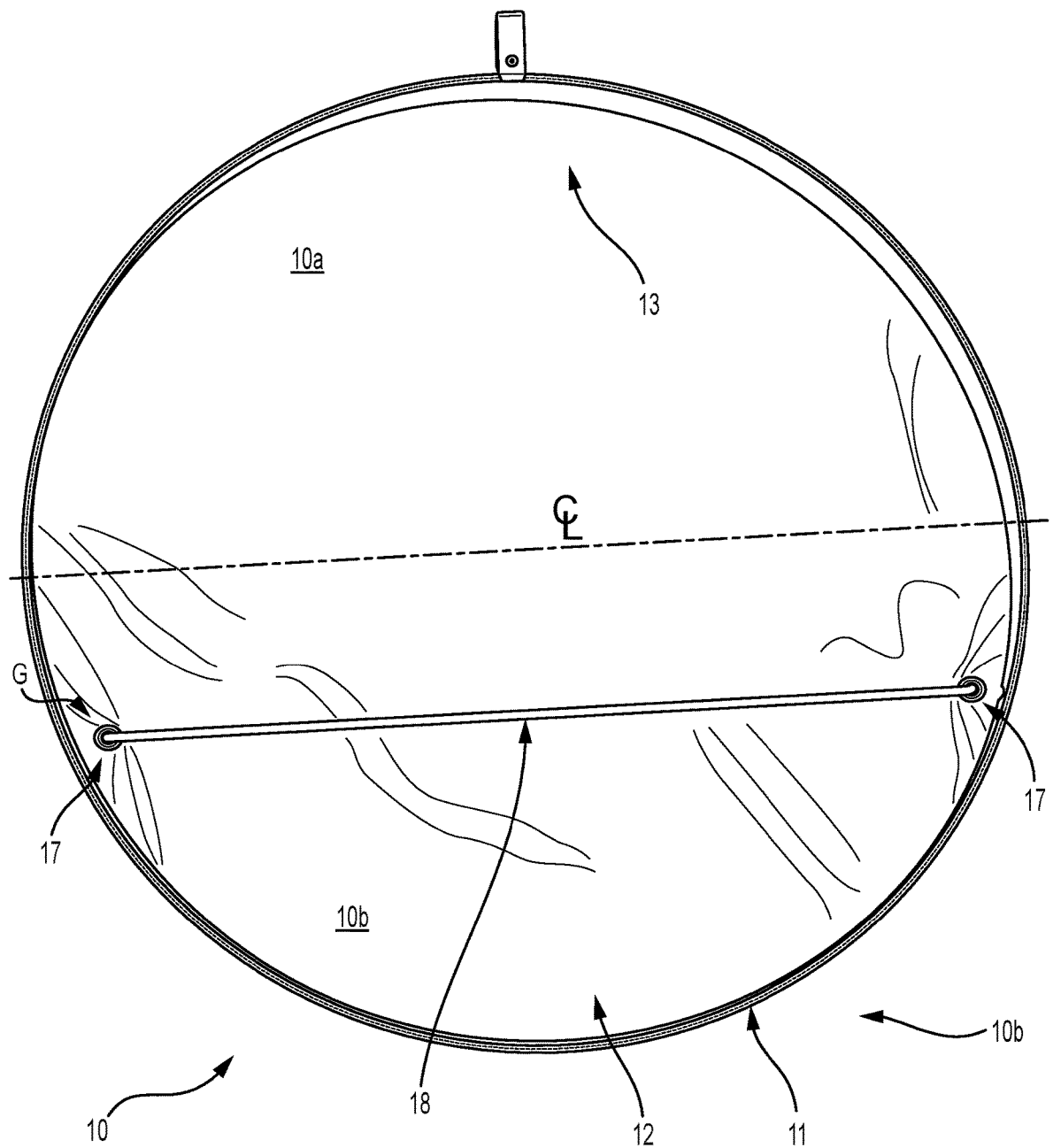
FIG. 2 depicts an embodiment of the back or tire facing side of the tire cover in the expanded state.
Figure 3:
FIG. 3 depicts an embodiment of the tire cover in the folded state.

FIG. 2 depicts a rear side of the tire cover 10 configured to face inward toward an exterior sidewall of the tire 30 when installed on the tire 30. In one embodiment, as shown in FIG. 2, the tire cover 10 includes a flexible frame 11. The flexible frame 11 is formed in a circular shape when not folded and made of a material that, after folding the flexible frame 11, can return to the not-folded circular shape. As shown in FIG. 3, the flexible frame 11 may be twisted and folded down to a smaller circular shape approximately ⅓ of the size of the unfolded circular shape. The flexible frame 11 can be made from materials including plastic or metal. The diameter of the flexible frame 11 when unfolded is approximately the same as the diameter of the tire of the vehicle or the diameter of the wheel well of the vehicle. Thus, tire covers 10 having different size diameters can fit a corresponding vehicle having a tire size or wheel well size corresponding to the diameter of the tire cover 10.

The tire cover 10 further includes a flexible fabric sheet 12 that covers the flexible frame 11. The flexible fabric sheet 12 is also a circular shape having a diameter that is slightly larger than the diameter of the flexible frame 11 when unfolded in an open state. Thus, the flexible fabric sheet 12 can be attached along the circumference of the flexible frame 11 by folding the outer circumferential edge of the flexible fabric sheet 12 around the flexible frame 11 to form a hem into which the flexible frame 11 is located. The flexible fabric sheet 12 may also be attached to the flexible frame 11 by other methods such as fabric loops located along the circumference of the flexible fabric sheet into which the flexible frame 11 is located. In another embodiment, the flexible frame 11 may be inserted between two flexible fabric sheets 12 such that the flexible frame 11 is positioned adjacent to a seam joining the two flexible fabric sheets 12.

The flexible fabric sheet 12 may include a single layer or alternatively may include multiple layers. The flexible fabric sheet 12 may include materials that block ultraviolet (UV) rays, reflect sunlight, and/or block heat. When the flexible fabric sheet includes two layers, one of the two layers may include one material and another of the two layers may include another material different than the one material. In one embodiment, when the flexible fabric sheet 12 includes two layers, one of the two layers facing the outside includes a material that blocks ultraviolet (UV) rays or reflects light, and another of the two layers facing the inside includes a material that blocks heat.

In one embodiment, as shown in FIG. 2, a top fastener 13 is attached to a top portion 10a of the tire cover 10. When the tire cover 10 includes a single flexible fabric sheet 12, the top fastener 13 may be attached to the hem or one of the fabric loops. When the tire cover 10 includes at least two flexible fabric sheets 12, the top fastener 13 may be attached to a seam joining the at least two flexible fabric sheets 12. The tire cover 10 is not limited to a single top fastener 13 and may include multiple top fasteners 13 placed near the top of the flexible fabric sheet 12 and offset from each other.

Figure 4:
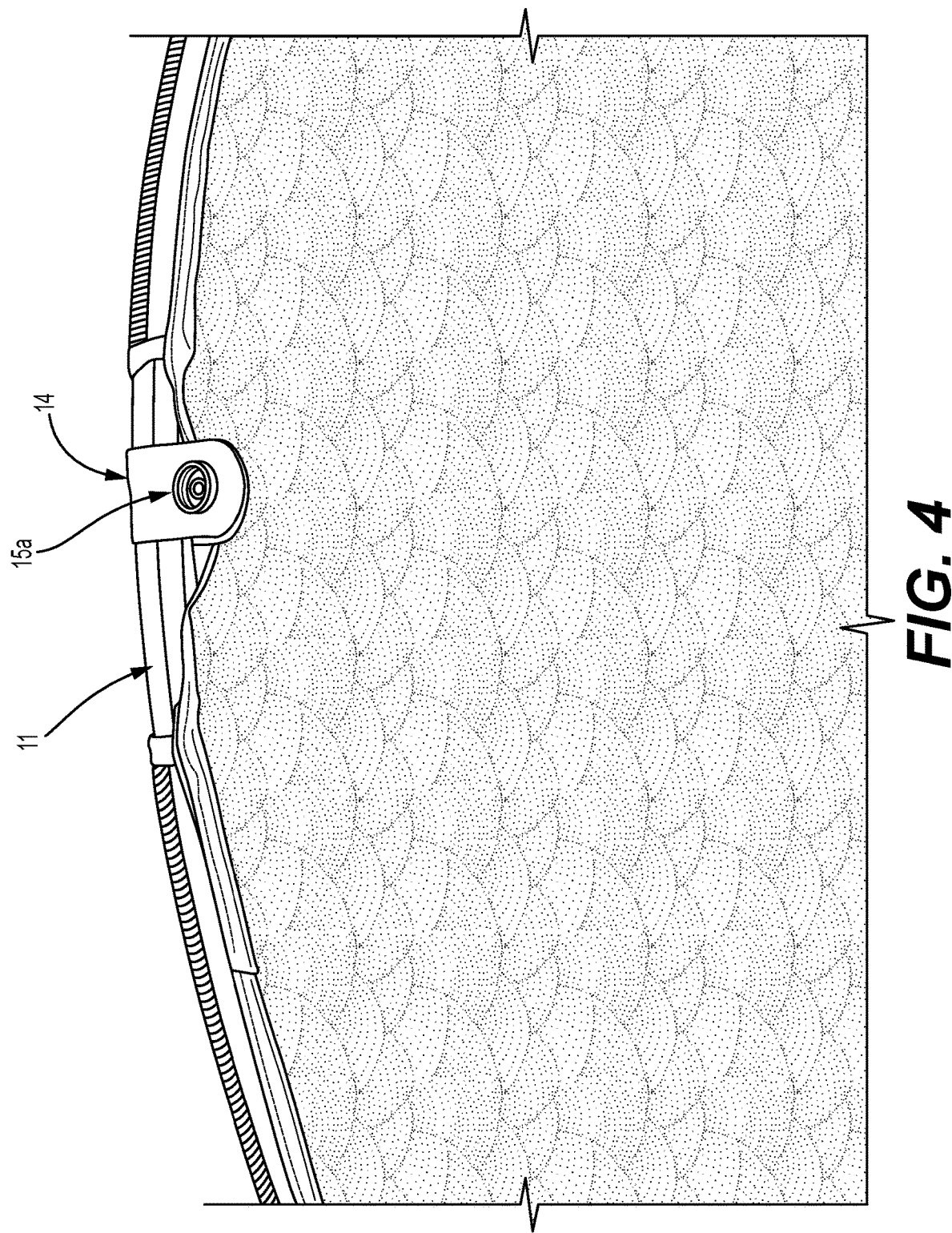
FIG. 4 depicts an embodiment of the tire cover including a fabric strap connected to the flexible frame and including a snap fastener.

In one embodiment, the hem of the single flexible fabric sheet 12 includes an opening to expose a portion of the flexible frame 11. In another embodiment, as shown in FIG. 4, the seam connecting two flexible fabric sheets 12 includes an opening to expose the portion of the flexible frame 11. The fabric strap 14 is attached to the exposed portion of the flexible frame 11 by including the flexible frame 11 in a hem formed by sewing an edge of the fabric strap 14 after folding the fabric strap 14 around the flexible frame 11.

Figure 5:
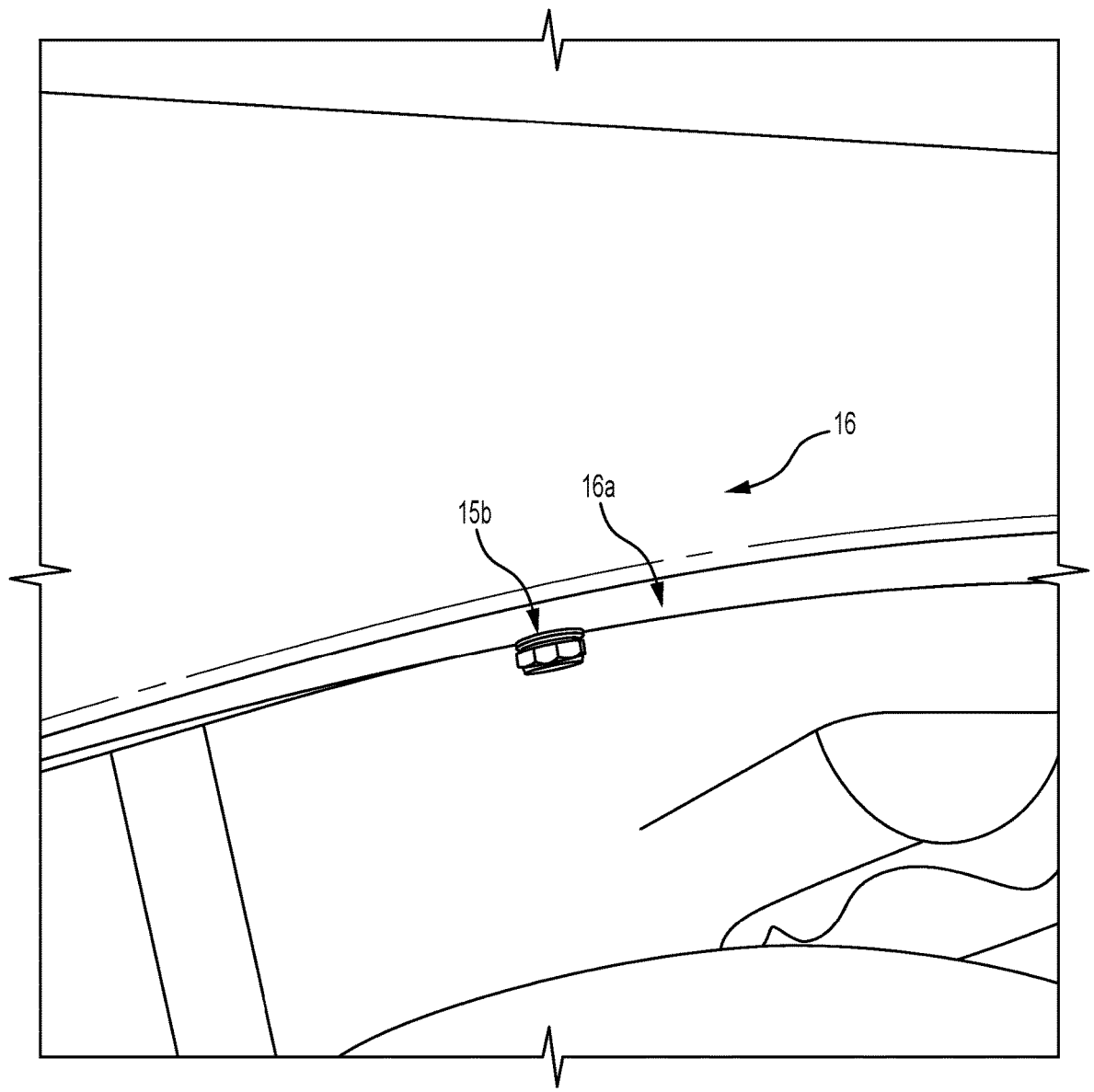
FIG. 5 depicts an embodiment of the tire cover in which one part of the snap fastener is attached to the wheel well of the vehicle.

Alternatively, the fabric strap 14 may be sewn directly on the flexible fabric sheet 12. The top fastener 13 may be attached to the fabric strap 14. As shown in FIGS. 4 and 5, the top fastener 13 may be a snap fastener in which one part 15a of the snap fastener (as shown in FIG. 4) is attached to the fabric strap 14 and another part 15b of the snap fastener (as shown in FIG. 5) is attached to a wheel well 16 of the vehicle 20. The top fastener 13 is not limited to a snap fastener 15. The flexible fabric sheet 12 may also be attached to the vehicle 20 by the top fastener 13 that may be one of a magnet, a button loop, a hook-and-loop fastener (Velcro), clips, or the like.

Figure 6:
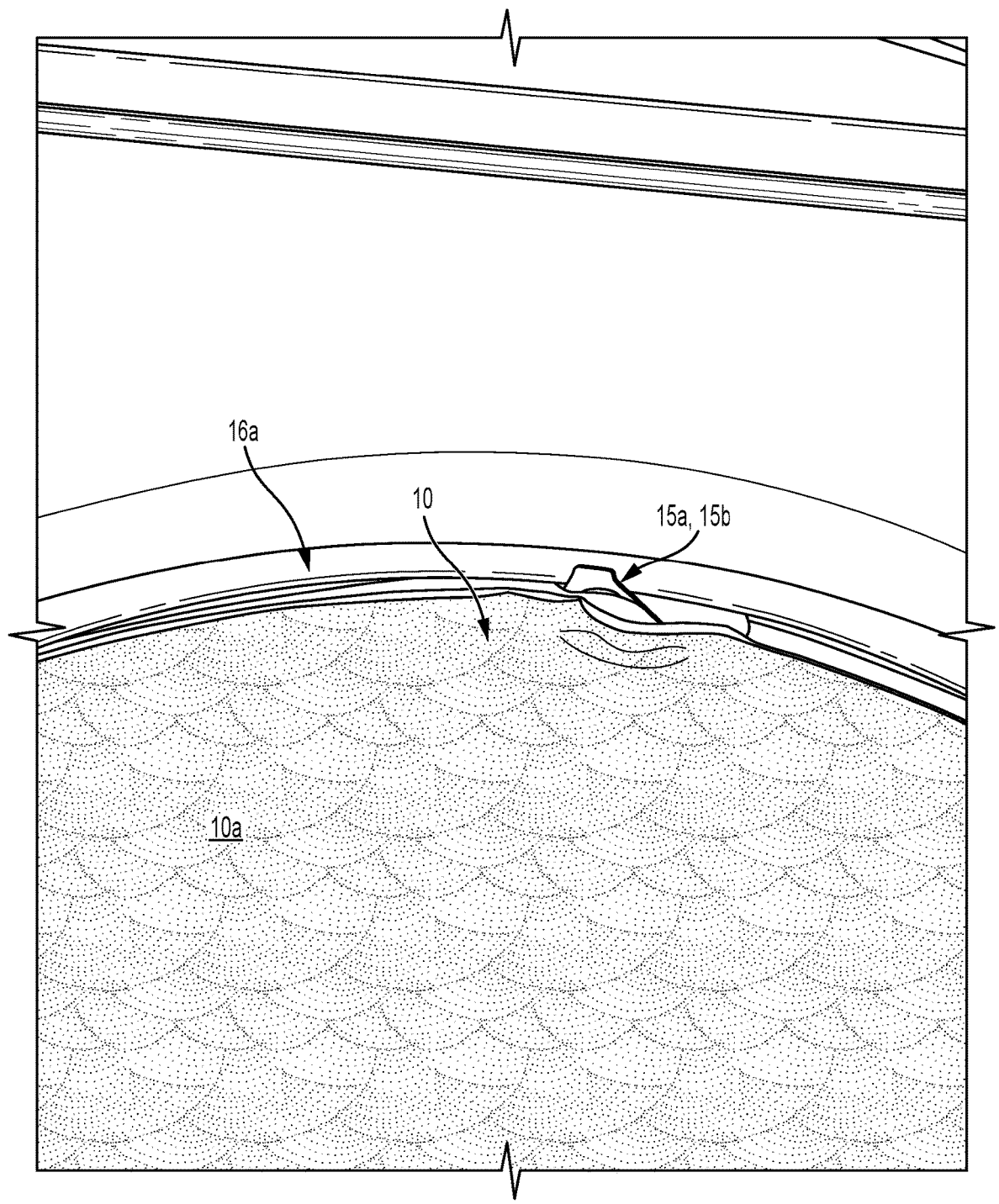
FIG. 6 depicts an embodiment of the tire cover in which the two parts of the snap fastener are pressed together to attach the tire cover to the wheel well.

As shown in FIG. 5, when a snap fastener is used to attach the flexible fabric sheet 12 to the vehicle 20, a hole may be drilled into the wheel well 16. In a large vehicle, such as an RV, the hole may be drilled in the lip 16a of the wheel well 16 so that the aesthetics of the vehicle 20 is not diminished when the tire cover 10 is not attached to the vehicle 20. The another part 15b of the snap fastener is attached to the wheel well 16 of the vehicle 20 by inserting the another part 15b of the snap fastener into an exterior portion of the hole and securing the another part of 15b the snap fastener via a nut (not shown) or other fastening device. The top portion 10a of the tire cover 10 is attached to the wheel well 16 by pressing the two parts 15a, 15b of the snap fastener together as shown in FIG. 6.

In a case a magnet is used as the top fastener 13, one magnet may be attached on or placed within the fabric strap 14. In this case, if the wheel well 16 is not metallic or does not have a magnetic field, an object having a magnetic field may be installed on the wheel well 16 so that the magnet is attracted to the object have the magnetic field to attach the tire cover 10 to the wheel well 16. If the wheel well 16 is metallic or does have a magnetic field, it may not be necessary to install another magnet on the wheel well since the one magnet may be attached directly to the wheel well.

In a case a button loop is used as the top fastener 13, the fabric strap 14 may be configured as a loop and a button may be installed on the wheel well 16 so that the button is slipped through the loop to attach the tire cover 10 to the wheel well 16. A similar configuration may be used for a hook-and-loop fastener or any other fasteners having two parts.

Figure 7:
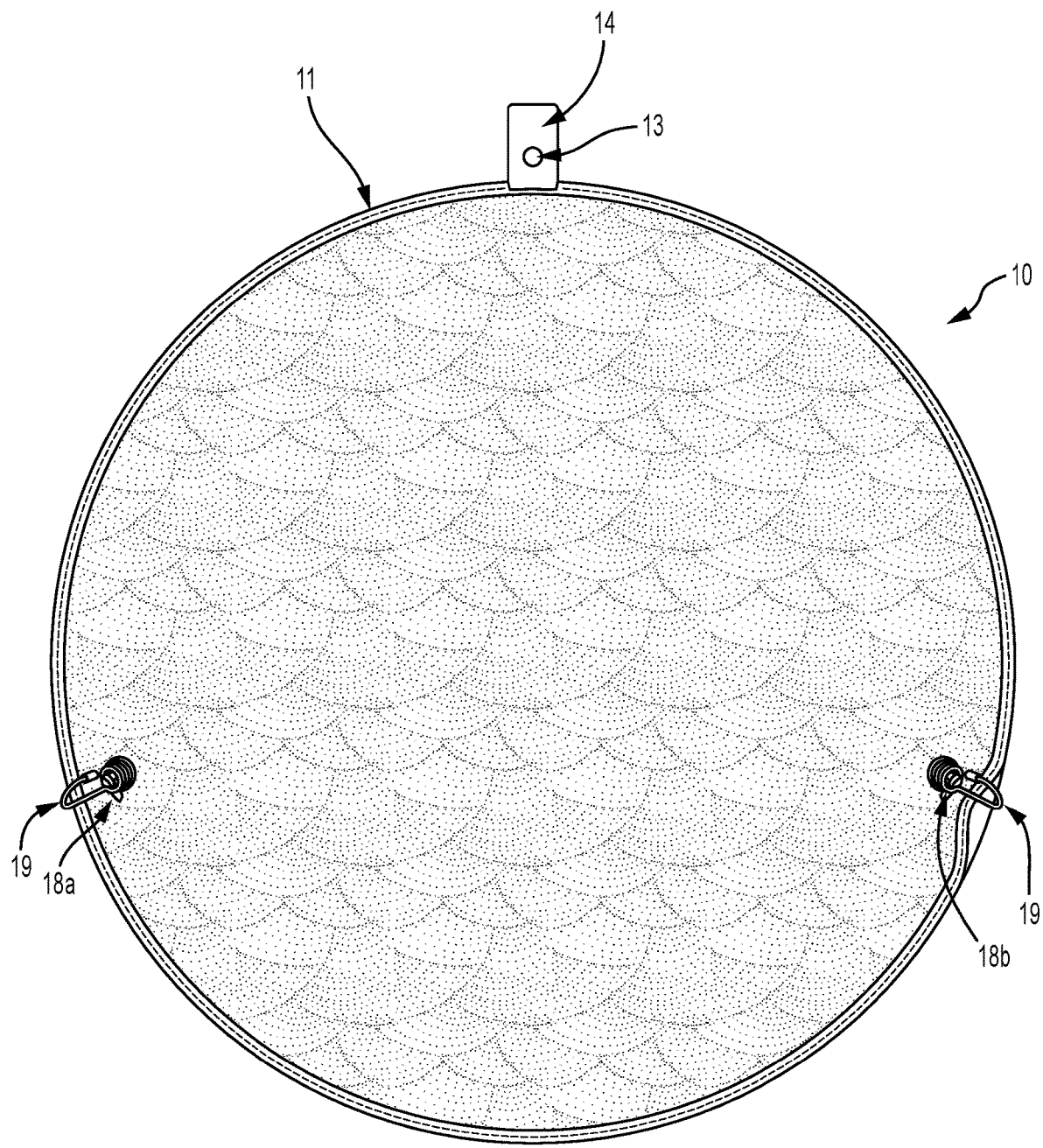
FIG. 7 depicts an embodiment of the front side of the tire cover in the expanded state.

Referring again to FIG. 2, when the tire cover 10 is oriented such that the top fastener 13 is located at the top portion 10a of the tire cover 10, the flexible fabric sheet 12 includes two holes 17 positioned adjacent to and below a horizonal center line CL of the tire cover 10. One of the two holes 17 is located adjacent to the periphery of the flexible fabric sheet 12 on one side of the top fastener 13 and another of the two holes 17 is located adjacent to the periphery of the flexible fabric sheet 12 on another side of the top fastener 13. The two holes 17 may be reinforced by grommets G to prevent the flexible fabric sheet 12 from tearing or fraying. A resilient fastener such as a bungee cord 18 having two ends 18a, 18b (as shown in FIG. 7) is attached to the tire over 10 by threading one end 18a of the bungee cord 18 through one hole 17a of the two holes 17 and another end 18b of the bungee cord 18 through another hole 17b of the two holes 17. A length of the bungee cord 18 is slightly longer than the distance between the two holes 17 such that two side fasteners 19 can be installed on the ends 18a, 18b of the bungee cord 18 as shown in FIG. 7.

Figure 8A:
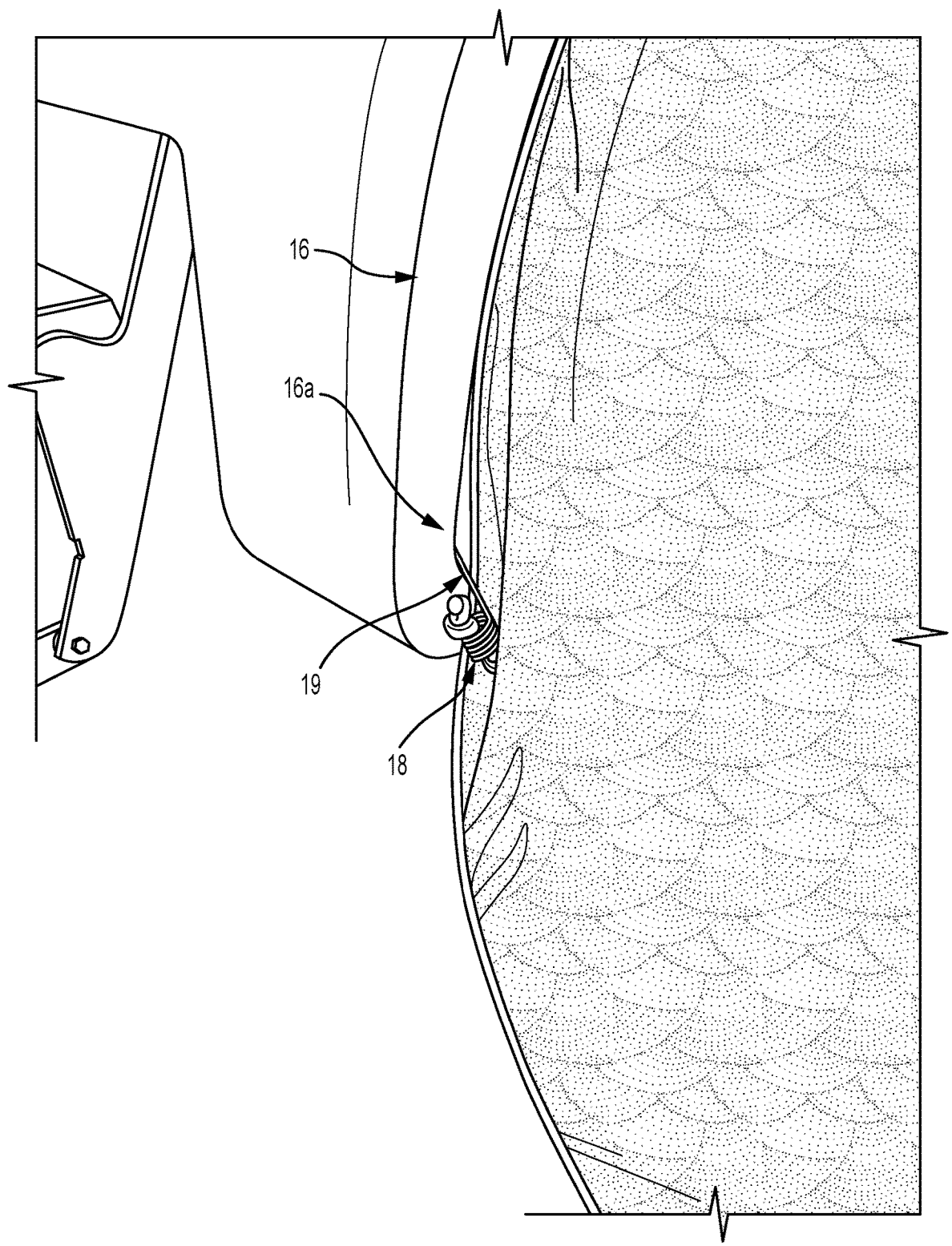
FIGS. 8A and 8B depict an embodiment of the tire cover having two side fasteners attached to the wheel well.
Figure 8B:
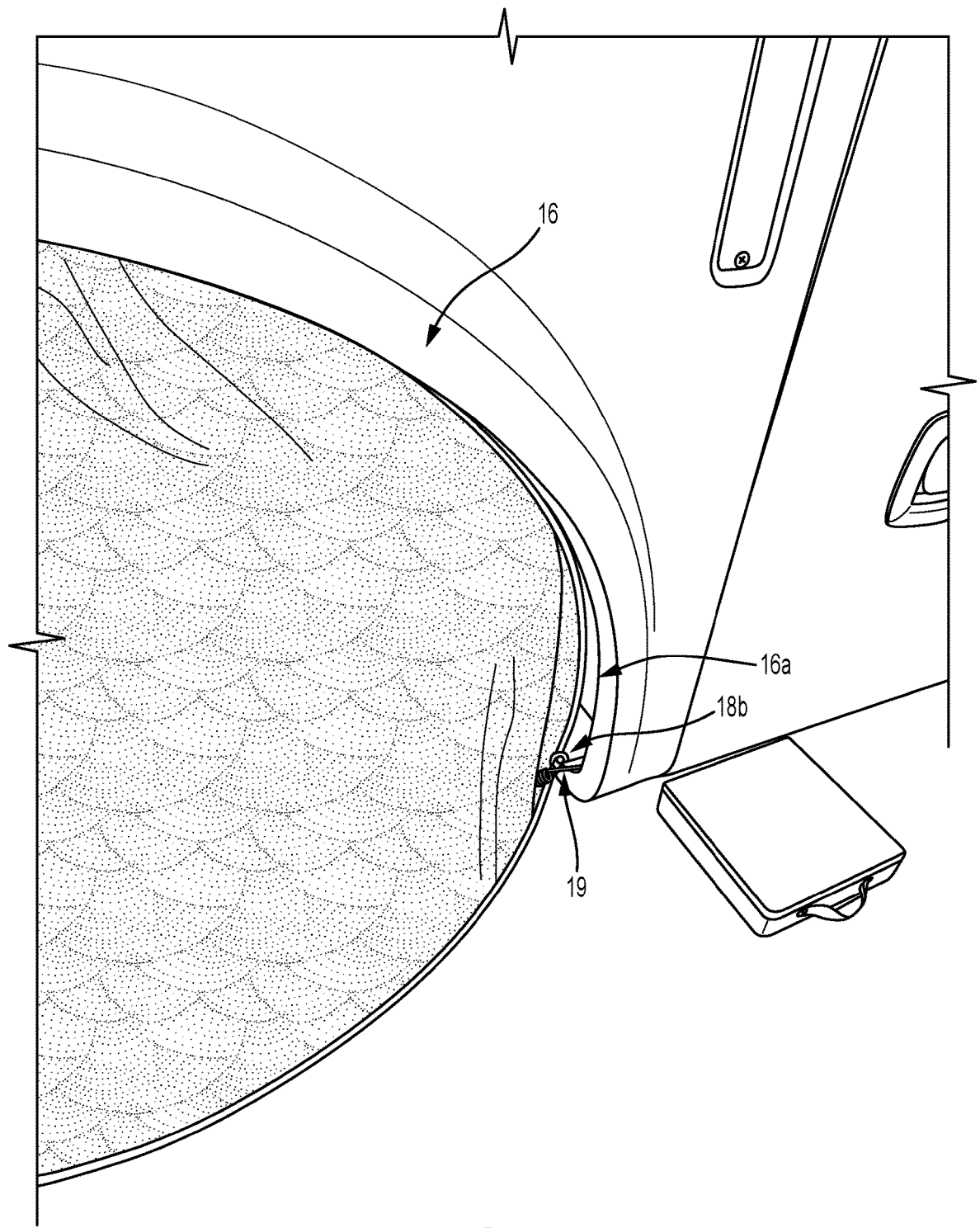

FIG. 7 depicts a front side of the tire cover 10 configured to face outward and away from an exterior sidewall of the tire 30 when installed on the tire 30. As shown in FIG. 7, both ends 18a, 18b of the bungee cord 18 protrude from the two holes 17 on the front side of the tire cover 10. The side fasteners 19 are installed at the ends 18a, 18b of the bungee cord 18. The sides of the tire cover 10 are attached to the wheel well 16 by attaching the side fasteners 19 to an inside of the lip 16a of the wheel well 16. As shown in FIGS. 7, 8A, and 8B, the side fasters can be hooks, and after the side fasteners 19 are attached to the wheel well 16, the bungee cord 18 is tensioned to hold the sides of tire cover 10 securely to the wheel well 16. Thus, when the top fastener 13 and the side fasteners 19 are attached to the wheel well 16, the tire cover 10 is securely attached to the wheel well 16 while leaving space between the tire cover 10 and the tire 30 to allow for ventilation so that moisture and heat do not become trapped between the tire cover 10 and the tire 30, thus reducing further degradation of the tire 30. The side fasteners 19 are not limited to including a hook. The side fasteners 19 may be one of a snap fastener, a magnet, a button loop, a hook-and-loop fastener (Velcro), clips, or the like.

The configuration of the top fastener 13 and side fasteners 19 allow for easy installation of the tire cover 10 such that the attachment points to the wheel well 16 are easily accessible to a user. The user does not have to reach into the wheel well 16 and does not have to bend down into awkward positions. Furthermore, the tire cover 10 is securely attached to the wheel well 16 using fewer attachment points than existing designs and does not need any further adjustment after attachment, thus reducing the time and effort to install the tire cover 10.

Figure 9:
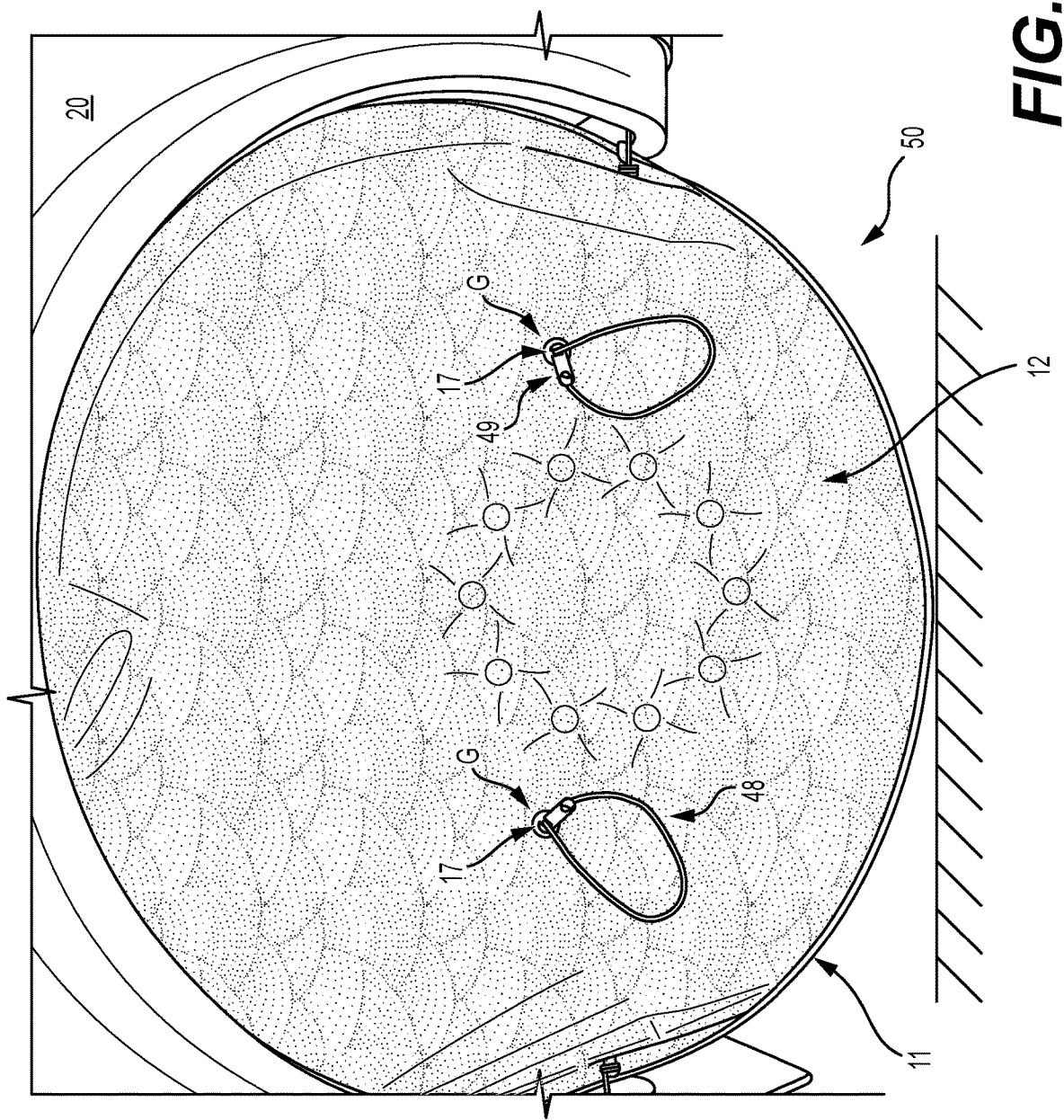
FIG. 9 depicts a second embodiment of a tire cover installed on a tire.

FIG. 9 depicts a second embodiment of a tire cover 50 installed on the vehicle 20. Substantially the same parts as those in the above-described embodiment are denoted by the same reference signs, and description thereof will be omitted.

Figure 10:
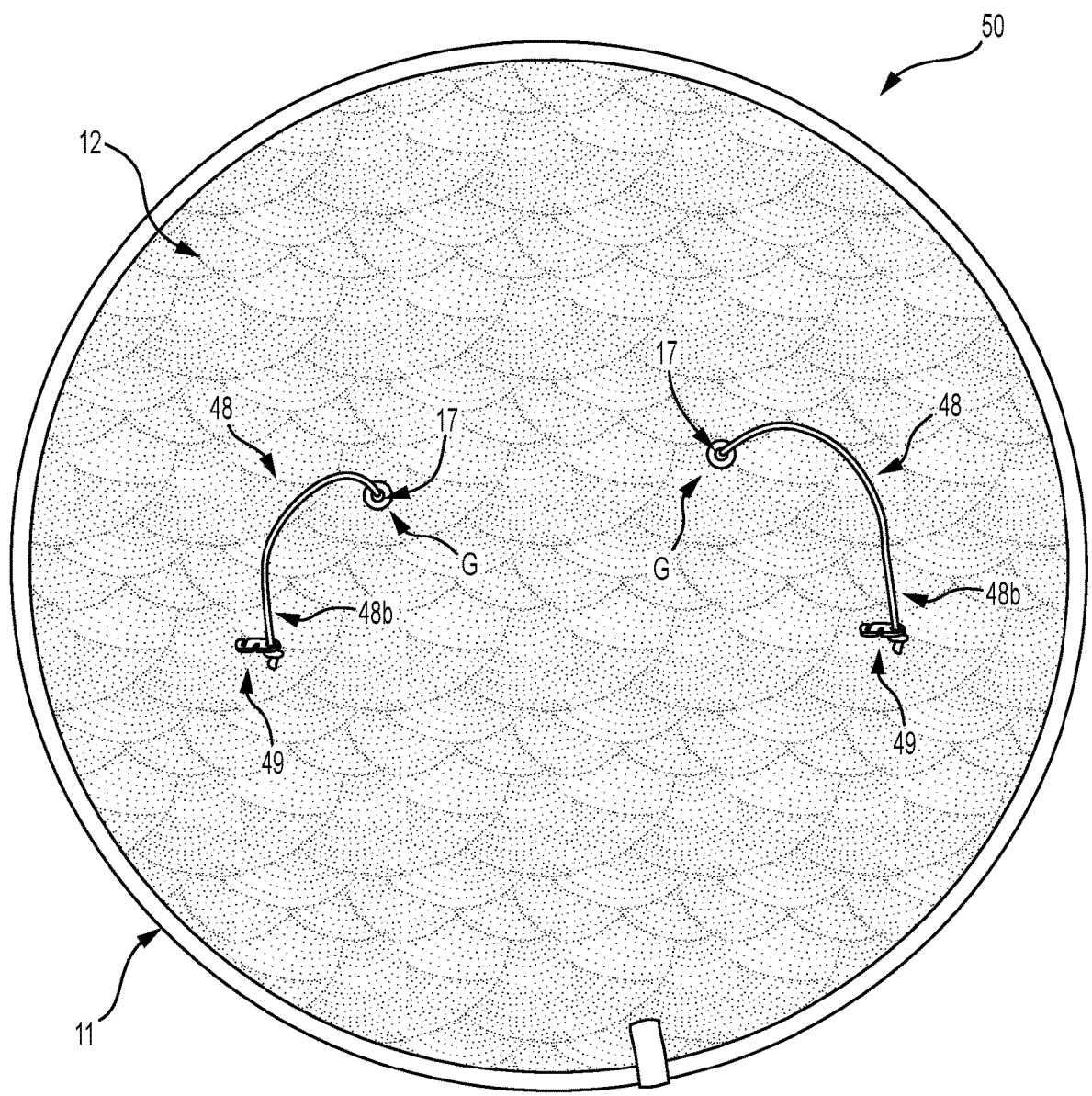
FIG. 10 depicts a front side of the second embodiment of the tire cover.
Figure 11:
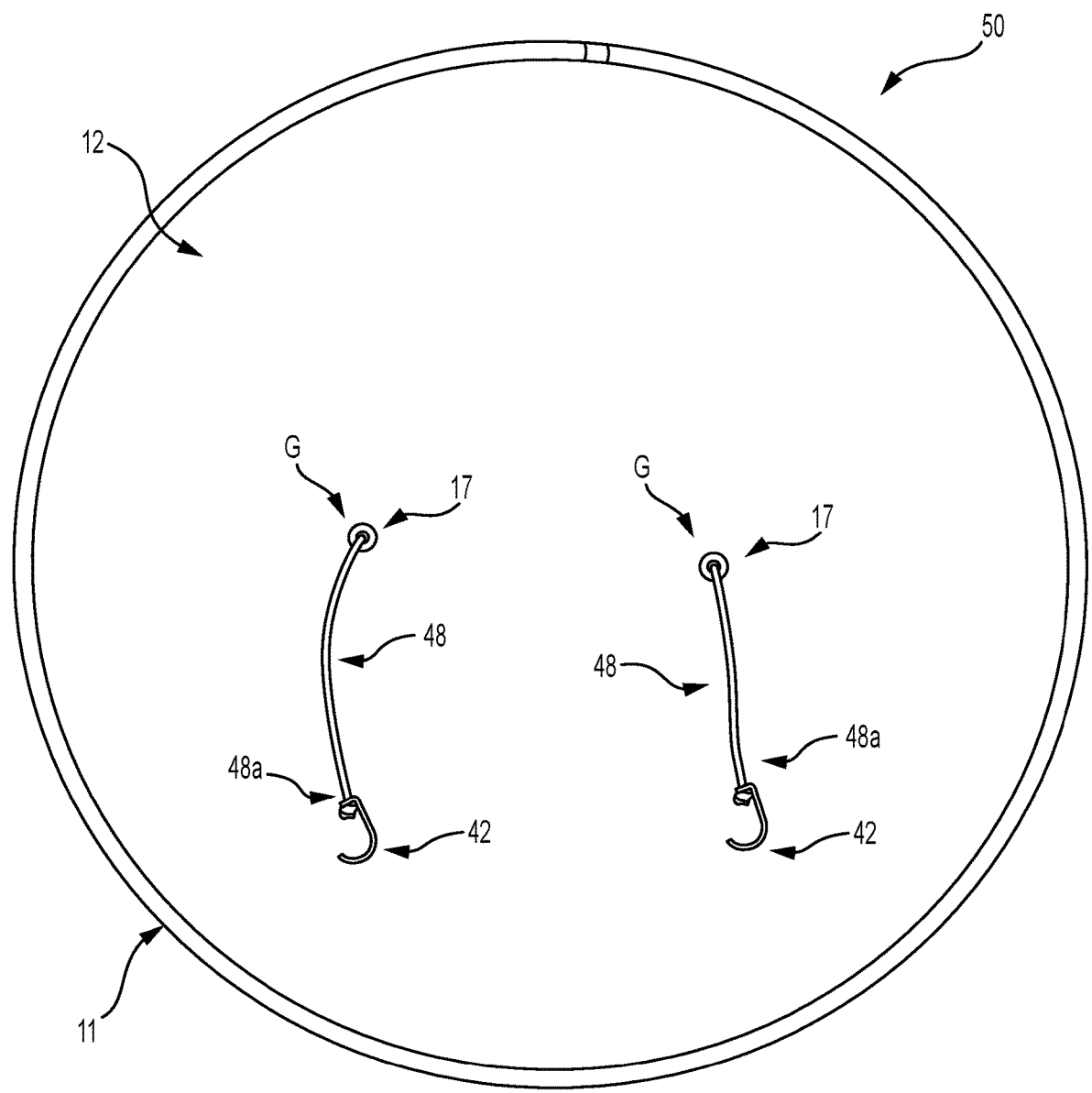
FIG. 11 depicts the back or tire facing side of the second embodiment of the tire cover.

FIG. 10 depicts a front side of the tire cover 50 configured to face outward and away from an exterior sidewall of the tire 30 when installed on the vehicle 20. As shown in FIG. 10, the tire cover 50 includes the flexible frame 11 and the flexible fabric sheet 12 that covers the flexible frame 11. The flexible fabric sheet 12 includes two holes 17 at a position corresponding to a wheel 31a to which the tire 30 is mounted when the tire cover 50 is installed on the tire 30. The two holes are preferably spaced apart evenly on each side of a center line CL of the tire cover 50 adjacent to a periphery of the wheel 31a when the tire cover 50 is installed on the tire 30. The two holes may be reinforced by grommets G to prevent the flexible fabric sheet 12 from tearing or fraying. A resilient fastener such as a bungee cord 48 is threaded through each of the two holes 17. A first end 48a (as shown in FIG. 11) of the bungee cord 48 is located at the back or tire facing side of the tire cover 50 and a second end 48b of the bungee cord 48 is located at the front side of the tire cover 50. The second end 48b of the bungee cord 48 may be attached to a cord lock 49 configured to be releasably attached to the bungee cord 48 so that the bungee cord 48 is releasably locked against longitudinal movement. The cord lock 49 can be a cord adjustor/rope tensioner as shown in FIGS. 9 and 10. The cord lock 49 is not limited to a cord adjustor/rope tensioner as shown in FIGS. 9 and 10. The cord lock 49 may be any one of a cord adjustor/rope tensioner having a different shape and/or configuration, a cord lock, a toggle stopper clip, a bungee lock stopper, a clip, or the like capable of being releasably attached to the bungee cord 48 so that the bungee cord 48 is releasably locked against longitudinal movement.

Figure 12:
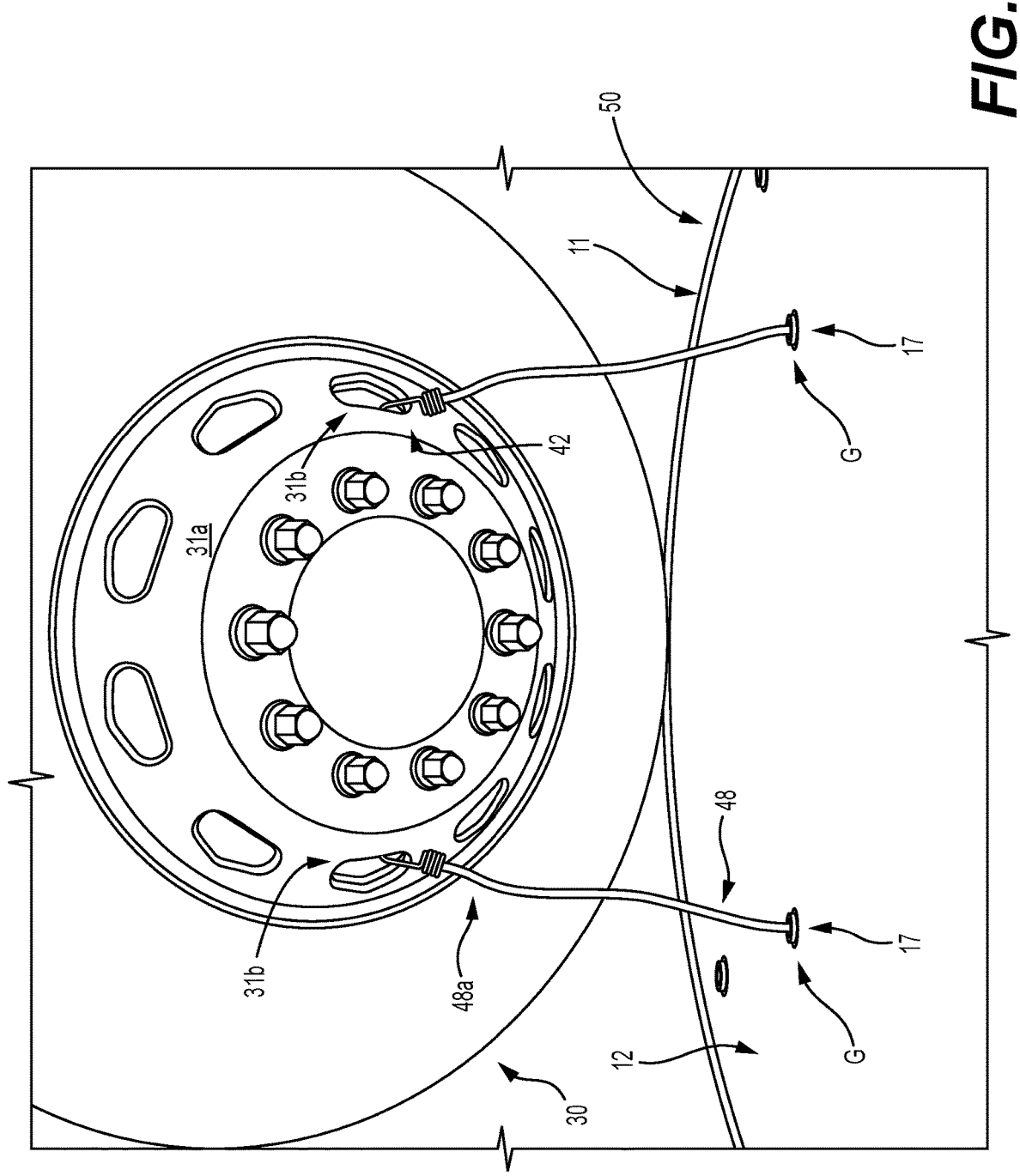
FIG. 12 depicts the second embodiment of the tire cover having two fasteners attached to a wheel of a vehicle.

FIG. 11 depicts a rear side of the tire cover 50 that faces an inward toward an exterior sidewall of the tire 30. In one embodiment, as shown in FIG. 11, the first end 48a of the bungee cord 48 is located at the back or tire facing side of the tire cover 50. The first end of the bungee cord 48 is attached to a fastener 42. The tire cover 50 is attached to the wheel 31a by attaching each fastener 42 attached to the first end 48a of the bungee cord 48 to an attachment point 31b of the wheel 31a such as a hole in the wheel 31a. As shown in FIGS. 11 and 12, the fasters 42 can be hooks, and after the fasteners 42 are attached to the attachment point 31b, the tire cover 50 is pushed into contact with the wheel while the bungee cords 48 are tensioned, and after the bungee cords 48 are tensioned, the cord locks 49 are secured to each of the bungee cords 48 so that the bungee cords 48 are releasably locked against longitudinal movement to hold the tire cover 14 securely to the wheel 31a and the tire 30. Thus, when the tire cover 50 is attached to the wheel 31a by the fasteners 42 and the cord locks 49 are secured to the bungee cords 48, the tire cover 50 is securely attached to the tire 30. The fasteners 42 are not limited to including a hook. The fasteners 42 may be one of a clamp, a magnet, a clip, or the like. The flexible fabric sheet 12 is not limited to only two holes and may include more than two holes to accommodate different attachment point positions.

INSTALLATION

Figure 13:
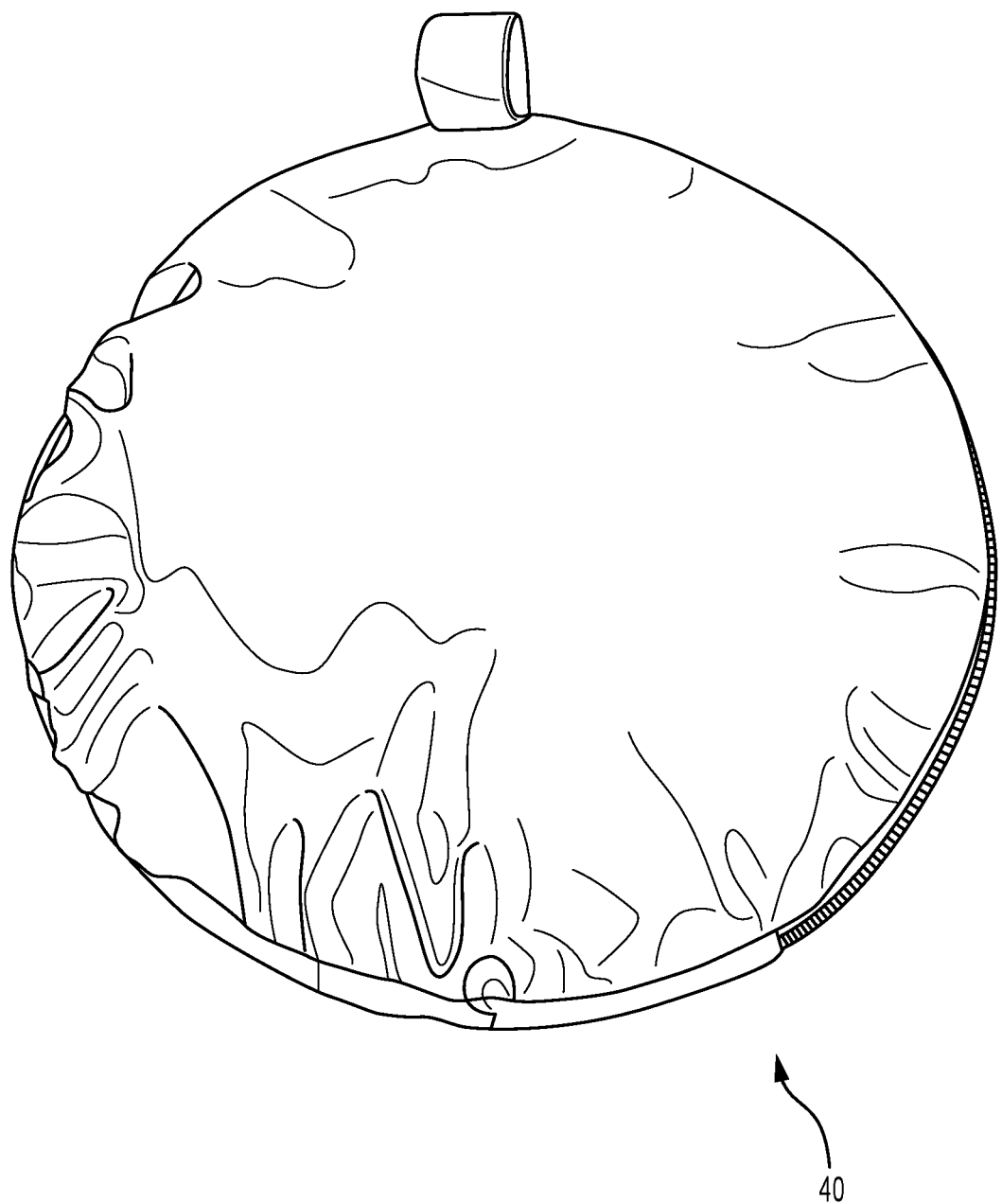
FIG. 13 depicts the tire cover in the folded state and stored in a storage bag.

A description of the installation process of the tire cover 10 is now provided. The tire cover 10 may be stored in a bag 40 (as shown in FIG. 13) when the tire cover 10 is folded down to approximately ⅓ size of the unfolded circular shape as shown in FIG. 3. After removing the tire cover 10 from the bag 40, the tension from the flexible frame 11 causes the tire cover 10 to expand to its full size as shown in FIG. 2.

In one embodiment, the tire cover 10 includes the fabric strap 14 including one part 15*a* of the snap fastener attached thereto and the wheel well 16 includes another part 15*b* of the snap fastener attached thereto. The user may press the one part 15*a* to the another part 15*b* to securely attach the two parts 15*a*, 15*b* of the snap fastener thereby securing the top portion 10*a* of the tire cover 10 to the lip 16*a* of the wheel well 16 as shown in FIG. 6. The user may then attach each of the side fasteners 19 to the lip 16*a* on both sides of the wheel well 16 thereby securely attaching the tire cover 10 to the wheel well 16 as shown in FIGS. 8A and 8B.

A description of the installation process of the tire cover 50 of the second embodiment is now provided. The tire cover 50 may be stored in a bag 40 (as shown in FIG. 13) when the tire cover 50 is folded down to approximately ⅓ size of the unfolded circular shape as shown in FIG. 3. After removing the tire cover 50 from the bag 40, the tension from the flexible frame 11 causes the tire cover 50 to expand to its full size as shown in FIGS. 10 and 11.

In the second embodiment, the tire cover 50 include the hooks 40 attached to the first end 48*a* of the bungee cord 48, and after the fasteners 42 are attached to the attachment point 31*b* as shown in FIG. 12, the tire cover 50 is pushed into contact with the wheel 31*a* while the bungee cords 48 are tensioned. While the bungee cords 48 are tensioned, the cord locks 49 are secured to each of the bungee cords 48 so that the bungee cords 48 are releasably locked against longitudinal movement to hold the tire cover 50 securely to the wheel 31*a* and the tire 30. Thus, when the tire cover 50 is attached to the wheel 31*a* by the fasteners 42 and the cord locks 49 are secured to the bungee cords 48, the tire cover 50 is securely attached to the tire 30 as shown in FIG. 9.

Any reference in this specification to an "embodiment" means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other embodiments. The features of any one embodiment may be combined with features of one or more other embodiments described herein to form additional embodiments.

Although the present invention has been described herein with reference to a number of illustrative embodiments, numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

For example, the present technology can adopt the following configurations.

(1) A tire cover, including:

a flexible fabric sheet having a front side, a rear side, a top, and a bottom;

a flexible frame coupled to a periphery of the flexible fabric sheet, the flexible fabric sheet including two holes, one of the two holes located on one side of a center line of the flexible fabric sheet and another of the two holes located on another side of the center line of the flexible fabric sheet;

two resilient fasteners, each of the two resilient fasteners having a first end and a second end and being threaded through a respective one of the two holes so that the first end is positioned at the front side of the flexible fabric sheet and the second end is positioned at the rear side of the flexible fabric sheet;

two fasteners, one of the two fasteners being attached to the first end of one the resilient fasteners and another of the two fasteners being attached to the first end of another of the resilient fasteners, the two fasteners being configured to attach to a wheel of a vehicle; and two resilient fastener locks configured to be secured to a respective one of the two resilient fasteners at the front side of the flexible fabric sheet so that the resilient fasteners are releasably locked against longitudinal movement to hold the tire cover securely to the wheel and a tire mounted to the wheel.

(2) The tire cover of (1), wherein the flexible fabric sheet includes two layers, and the flexible frame is inserted between the two layers such that the flexible frame is positioned adjacent to a seam joining the two layers.

(3) The tire cover of (1) or (2), wherein the one hole and the another hole are located on the center line of the tire cover.

(4) The tire cover of any of (1) through (3), wherein the two resilient fasteners include a bungee cord.

(5) The tire cover of claim (1) through (4), wherein the one hole and the another hole are reinforced by grommets.

(6) The tire cover of any of (1) through (5), wherein the two fasteners are one of a hook a magnet, or a clip.

(7) The tire cover of any of (1) through (6), wherein the flexible fabric sheet includes material that blocks ultraviolet (UV) rays or reflects light.

(8) The tire cover of any of (1) through (7), wherein the flexible frame is configured to transition between a folded state and an open state in which the flexible fabric sheet is tensioned, and the flexible frame includes a wire formed in a circular shape when not folded in the open state and is made of a material that, after folding the flexible frame to the folded state, can return to the circular shape in the open state.

(9) The tire cover of any of (1) through (8), wherein the flexible fabric sheet includes two layers, and the two layers include materials different from each other.

(10) The tire cover of any of (1) through (9), wherein the rear side of the tire cover faces inward toward an exterior sidewall of the tire, and the front side of the tire cover faces outward away from the exterior sidewall of the tire.

(11) The tire cover of any of (1) through (10), wherein the flexible fabric sheet includes a single layer of material, and the flexible frame is inserted inside a hem formed by folding an outer circumferential edge of the single layer of material around the flexible frame.

(12) The tire cover of any of (1) through (11), wherein the flexible fabric sheet includes two layers of material, one of the two layers of material facing the front side includes material that blocks ultraviolet (UV) rays or reflects light, and another of the two layers of material facing the rear side includes material that blocks heat.

(13) The tire cover of any of (1) through (12), wherein the two fasteners include a hook.

What is claimed is:

1. A tire cover, comprising:
a flexible fabric sheet having a front side, a rear side, a top, and a bottom;
a flexible frame coupled to a periphery of the flexible fabric sheet, the flexible fabric sheet including two holes, one of the two holes located on one side of a center line of the flexible fabric sheet and another of the two holes located on another side of the center line of the flexible fabric sheet;
two resilient fasteners, each of the two resilient fasteners having a first end and a second end and being threaded through a respective one of the two holes so that the first end is positioned at the front side of the flexible fabric sheet and the second end is positioned at the rear side of the flexible fabric sheet;
two fasteners, one of the two fasteners being attached to the first end of one the resilient fasteners and another of the two fasteners being attached to the first end of another of the resilient fasteners, the two fasteners being configured to attach to a wheel of a vehicle; and
two resilient fastener locks configured to be secured to a respective one of the two resilient fasteners at the front side of the flexible fabric sheet so that the resilient fasteners are releasably locked against longitudinal movement to hold the tire cover securely to the wheel and a tire mounted to the wheel.

2. The tire cover of claim 1, wherein
the flexible fabric sheet includes two layers, and
the flexible frame is inserted between the two layers such that the flexible frame is positioned adjacent to a seam joining the two layers.

3. The tire cover of claim 1, wherein
the one hole and the another hole are located on the center line of the tire cover.

4. The tire cover of claim 1, wherein
the two resilient fasteners include a bungee cord.

5. The tire cover of claim 1, wherein
the one hole and the another hole are reinforced by grommets.

6. The tire cover of claim 1, wherein
the two fasteners are one of a hook a magnet, or a clip.

7. The tire cover of claim 1, wherein
the flexible fabric sheet includes material that blocks ultraviolet (UV) rays or reflects light.

8. The tire cover of claim 1, wherein
the flexible frame is configured to transition between a folded state and an open state in which the flexible fabric sheet is tensioned, and
the flexible frame includes a wire formed in a circular shape when not folded in the open state and is made of a material that, after folding the flexible frame to the folded state, can return to the circular shape in the open state.

9. The tire cover of claim 1, wherein
the flexible fabric sheet includes two layers, and
the two layers include materials different from each other.

10. The tire cover of claim 1, wherein
the rear side of the tire cover faces inward toward an exterior sidewall of the tire, and
the front side of the tire cover faces outward away from the exterior sidewall of the tire.

11. The tire cover of claim 1, wherein
the flexible fabric sheet includes a single layer of material, and
the flexible frame is inserted inside a hem formed by folding an outer circumferential edge of the single layer of material around the flexible frame.

12. The tire cover of claim 1, wherein
the flexible fabric sheet includes two layers of material,
one of the two layers of material facing the front side includes material that blocks ultraviolet (UV) rays or reflects light, and
another of the two layers of material facing the rear side includes material that blocks heat.

13. The tire cover of claim 1, wherein
the two fasteners include a hook.

* * * * *